United States Patent Office 3,494,769
Patented Feb. 10, 1970

3,494,769
PROCESS OF PREPARING OATS CEREAL
Donald K. Tressler, P.O. Box 388,
Westport, Conn. 06880
No Drawing. Filed June 28, 1966, Ser. No. 561,035
Int. Cl. A23l 1/10
U.S. Cl. 99—83      4 Claims

ABSTRACT OF THE DISCLOSURE

An oat breakfast cereal suitable for use as a cold cereal by the addition of milk or as a hot cereal by the addition of hot tap water is prepared by heating rolled oats for a period of from 5 to 60 minutes at a temperature of between 180° and 260° F. to at least cook the starch and protein contained therein, applying liquid milk in sufficient quantity only to wet the oats and to distribute it evenly throughout the oat product, and then drying the wet product to crispness, thereby producing a crunchy product.

---

This invention relates to a new and improved process for the production of a breakfast cereal made from rolled oats which is ready to eat by merely adding cold milk or other fluid or by adding hot water from the tap. The present invention also relates to a novel oat cereal product which requires no cooking and is characterized by crunchiness when eaten with the addition of milk, or it can be asoft, absorbtive product with a suggestion of crispness. The invention relates more particularly to a novel technique for modifying rolled oats which achieves a cereal having an unusual flavor when eaten cold by the simple addition of milk or cream, or as a hot cereal by the addition of hot water. Moreover, the improved method eliminates the necessity of forming a dough, rolling it, cooking it and flaking it.

An important object of the invention is to provide a novel process of making an oat breakfast cereal product which can be a soft, absorbtive one, or which by a simple modification can be formed as a crunchy one which does not absorb milk or water readily and, therefore, remains crunchy, when cold milk or hot tap water is added, for about as long as it normally required to eat an average bowl of the product. If desired, a cereal with a fruit or other flavor can be obtained by the simple addition of cream substitute, crushed fruit, fruit purées or fruit powder, or fruit concentrate at some point during the several steps required in its preparation.

An object of the present invention is to provide a process which produces a tastier oat cereal then is made by any of the earlier methods and which is more desirable from a commercial standpoint because of its simplicity and ease of operation.

The starting material is what is known commercially as "rolled oats" which if cooked as generally directed produce a rather soft, mushy, sticky and pasty porridge. The principal reason for the cooking is to eliminate the raw flour flavor. In accordance with the present invention, the rolled oats may first be heated to a temperature of 180° to 240° F. for a period of 5 to 60 minutes without the addition of water or other fluid. The time and temperature are, of course, correlating factors. In actual practice, I have secured the best results by heating in an autoclave at a temperature of not less than 212° F. nor more than 260° F. If the heating is carried out in an oven or by the use of microwaves, instead of the autoclave, the temperature of the product should be raised to at least 180° F. A higher temperature may be employed but not high enough to brown the product. After this or other heat treatment to partially cook the starch and protein, the flaky or granular cereal is either sprayed or sprinkled with milk in which sugar, salt, fruit juice purée and/or other flavoring materials are dissolved which is absorbed by the oat flakes evenly distributed throughout the body of the flakes.

Although not absolutely necessary, the addition of either cream, butter fat or cream substitute to the milk is desirable and improves both the flavor and texture of the product. The cream or dry cream substitute may be added in either of the two following ways: (1) it may be mixed with the milk in which sugar, salt, etc. are dissolved, or (2) it may be added to the cereal in a conventional mixer, after the milk containing the other additives has been added. In the latter case, if a dry cream substitute is used, it may be dusted onto the cereal while the mixer is operating.

The milk so applied is only enough to wet the product, that is to say the product is not "swimming" in milk. The moist cereal is now spread thinly on a surface like a cookie sheet and heated sufficiently both to warm it to 140° F. or above, and to dry it. If desired, in order to obtain a modified flavor, the flaky or granular cereal product may be toasted. However, this toasting is not necessary in order to obtain a crunchy product.

An alternative and simpler procedure devised by me for the production of my novel cereal is the following: the rolled oats, either the old fashioned type or comminuted flakes, are placed in a "Hobart" mixer. Then with the mixer operating, the cereal is either sprayed or sprinkled with milk or cream in which sugar, salt, fruit juice, fruit juice purée, and/or other flavoring materials are dissolved. Then while the mixer is still operating, the dry cream substitute is dusted on. After thorough mixing, the contents of the mixer bowl are emptied onto a hot cookie sheet which is immediately placed in a hot oven (300° to 500° F.) for a period of from 1 to 5 minutes. The cereal is then dried before a fan. The heating in the hot oven cooks the cereal sufficiently so that even when the old fashioned rolled oats are used, the product does not have a raw flavor and can be eaten as a cold cereal.

If a relatively small amount of milk is used and little fruit is added, the product will be relatively soft and water absorptive and not "crunchy." Such a product is especially desirable for use in making a hot cereal. It has the advantage over ordinary rolled oats breakfast foods inasmuch as it requires only the addition of hot water (140° F. or above) in order to prepare it for the table. If a higher proportion of milk with fruit is used to wet the cereal, when the product is thereafter dried, it is crunchy and especially desirable for use either as a cold or hot cereal. It does not absorb milk or cream readily and, therefore, retains its crunchiness for sometime after being wetted. Furthermore, if hot water, even boiling water, is added, it still retains some of its crunchiness and is desired by some as a novel hot cereal.

EXAMPLE 1

As an example of the process of making my novel breakfast food, I took 200 grams of old fashioned rolled oats and comminuted it slightly so that each flake was broken into two or three pieces. This comminution was carried out in an ordinary ice crusher. The comminuted rolled oats were placed in a covered aluminum container which was, in turn, placed in a steam autoclave. After the air had been exhausted from the autoclave, the oats were heated for 30 minutes at 15 lb. per square inch steam pressure. Then the steam was exhausted and the autoclave opened, the oats (still dry) allowed to cool to 90° F. and placed in the bowl of a Hobart mixer. The agitator was started, first running at the low speed. Then I added a solution made by adding to 70 grams of cold, whole milk, 10 grams of a non-dairy imitation cream product, 10 grams of cane sugar, and 2 grams of salt were added and the mixture stirred until a thick emulsion was obtained. This milk solution was slowly added while the oats were being agitated in the Hobart mixer. After all of the milk solution had been added, the speed of the agitator was increased to "medium." Agitation at this speed was continued for two or three minutes. The moist oats were then emptied onto a cookie sheet which was placed on the shelf of an electric oven and dried before an electric fan until the product was dry and crisp. This product absorbed cream or milk readily and was a delicious breakfast cereal. When water at 140° F. was added to a bowl of this dry cereal, it was absorbed readily and the product resembled cooked rolled oats except that it was not pasty. If a softer and more mushy product is desired, it can be made by cooking the product with more water on top of the range. The resultant product resembles ordinary cooked old fashioned rolled oats except that it is not sticky.

EXAMPLE 2

As another example of the process of making my novel breakfast food, I took 200 grams of the grade of oats known as "baby flakes." These oats were placed in a covered aluminum container which was, in turn, placed in a steam autoclave. After the air had been exhausted from the autoclave, the oats were heated for 30 minutes at 15 lb. per square inch steam pressure. Then the steam was exhausted and the autoclave opened, the oats still dry were allowed to cool to 90° F. and placed in the bowl of a Hobart mixer. The agitator was started, first running at the low speed. Then I added a solution made by dissolving 10 grams of a non-dairy imitation cream product, 10 grams of cane sugar, 2 grams of salt in 70 grams of cold whole milk were then added and the mixture stirred until a thick solution was obtained. Then I added 40 more grams of cold milk and agitated the whole until solution was obtained. This milk solution was slowly added while the oats were being agitated in the Hobart mixer. After all of the milk solution had been added, the speed of the agitator was increased to "medium." Agitation at this speed was continued for two or three minutes. The moist oats were then emptied onto a cookie sheet which was placed on the shelf of an electric oven and dried before an electric fan until the product was dry and crisp. This product absorbed cream or milk readily and was a delicious breakfast cereal. When water at 140° F was added to a mass of this dry cereal, it was absorbed readily and the product resembled cooked rolled oats except that it was not pasty. If a softer and more mushy product is desired, it can be made by cooking the product with more water on top of the range. The resultant product resembles ordinary cooked old fashioned rolled oats except that it is not sticky.

EXAMPLE 3

As an alternate process of making my novel breakfast food, I took 200 grams of old fashioned rolled oats and comminuted the oats slightly so that each flake was broken into two or three pieces. This comminution was carried out in an ordinary ice crusher. 200 grams of this partly comminuted oat flakes were placed in a Hobart mixer. The agitator was started; then I added slowly a solution made by dissolving 10 grams of sugar and two grams of salt in 70 grams of cold whole milk. After all the milk solution had been added, the speed of the agitator was increased to "medium." Then 10 grams of a dry non-dairy imitation product was dusted on the cereal. Agitation was continued for one minute after all of the imitation cream product or coffee whitener had been added. Then the bowl was removed from the mixer and emptied onto a hot cookie sheet, which was immediately placed in an oven at 500° F, and allowed to remain there for three minutes. Then the oven door was opened and the product dried before a fan. The resulting product was crisp and had lost the flavor of raw oats and therefore suited for use as a cold cereal.

EXAMPLE 4

The procedure followed in Example 3 was repeated exactly as described above, except in this case 30 grams of a fruit purée, fruit juice or dried powdered fruit was also added to the milk solution prior to sprinkling it onto the cereal in the Hobart mixer. In this case, if a dried powdered or flaked banana was used, the cereal had a banana flavor. If a purée from dried apricots was used, the breakfast cereal had an apricot flavor, etc.

EXAMPLE 5

The procedure followed in Example 3 was followed exactly as described except that the dark brown sugar was substituted for the granular sugar. Further, the amount of sugar was increased from 10 grams to 30 grams. When dried, the cereal product had a pleasing brown sugar flavor.

EXAMPLE 6

The procedure described in Example 3 was followed exactly except that 30 grams of maple sugar was substituted for the 10 grams of granulated sugar used in the milk. This gave the product a pleasing maple flavor.

EXAMPLE 7

The procedure described in Example 3 was followed exactly with the exception that the imitation dry cream product was replaced with 30 grams of cocoa. The resultant product had a pleasing chocolate flavor.

While my process and the means for carrying the same into effect as well as the product of the present invention have been described above, my invention is not limited to the specific examples recited hereinabove, but the protection I desire to obtain by Letters Patent is set forth in the appended claims.

The embodiments of the invention in which an exclusive property or privilege is claimed are defined as follows:

1. A process for preparing a breakfast cereal suitable for use as a cold cereal by the addition of milk or as a hot cereal by the addition of hot tap water which comprises heating rolled oats for a period of from 5 to 60 minutes at a temperature of between 180° and 260° F. to at least partially cook the starch and protein contained therein, applying liquid milk in sufficient quantity only to wet the oats and to distribute it evenly throughout the same, and then drying the same.

2. The process defined in claim 1 wherein the heating step is performed before applying the milk.

3. The process defined in claim 1 wherein the milk is first applied and thereafter the product is subjected to said heat.

4. The process defined in claim 1 wherein there is added to the milk at least one ingredient selected from the class consisting of sugar, cream, salt, fruit juices and flavoring material.

References Cited

UNITED STATES PATENTS

| 2,864,702 | 12/1958 | Murray et al. | 99—80 |
| 2,898,210 | 8/1959 | Dale et al. | 99—80 |
| 2,928,743 | 3/1960 | Rutgers | 99—80 |
| 3,345,183 | 10/1967 | Lilly et al. | 99—80 |

RAYMOND N. JONES, Primary Examiner

U.S. Cl. X.R.

99—80